C. E. STARR.

DRIVING MECHANISM FOR MOTOR VEHICLES.

APPLICATION FILED MAY 16, 1922.

Reissued July 25, 1922. 15,424.

2 SHEETS—SHEET 1.

Witness

H. Sherburne

INVENTOR.
Charles E. Starr.
BY White Prost & Evans
his ATTORNEYS.

C. E. STARR.

DRIVING MECHANISM FOR MOTOR VEHICLES.

APPLICATION FILED MAY 16, 1922.

Reissued July 25, 1922. 15,424.

2 SHEETS—SHEET 2.

INVENTOR.
Charles E. Starr
BY White Prost & Evans
ATTORNEYS.

WITNESS.
Bernard R. Tolin

UNITED STATES PATENT OFFICE.

CHARLES E. STARR, OF OAKLAND, CALIFORNIA, ASSIGNOR TO PERFECTO GEAR DIFFERENTIAL CO., OF SEATTLE, WASHINGTON, A CORPORATION OF WASHINGTON.

DRIVING MECHANISM FOR MOTOR VEHICLES.

15,424. Specification of Reissued Letters Patent. Reissued July 25, 1922.

Original No. 1,362,360, dated December 14, 1920, Serial No. 293,189, filed April 28, 1919. Application for reissue filed May 16, 1922. Serial No. 561,515.

*To all whom it may concern:*

Be it known that I, CHARLES E. STARR, a citizen of the United States, and resident of Oakland, county of Alameda, and State of California, formerly of Sedro Woolley, county of Skagit, and State of Washington, have invented certain new and useful Improvements in Driving Mechanism for Motor Vehicles, of which the following is a specification.

My invention relates to a device which employs in combination a differential and a planetary gear system, whereby an additional change in speed may be secured by the action of mechanisms which are simple, compact, reliable and efficient.

The object of my invention is to combine with a differential, for such purposes as driving of automobiles a mechanism by which an additional change in speed may be secured, and to have the entire device simple and compact. The invention consists of the combination of parts, which will be hereinafter described and then defined by the claims which terminate this specification.

In the accompanying drawings I have illustrated my device embodied in the form of construction which I now most prefer to use.

Figure 1:
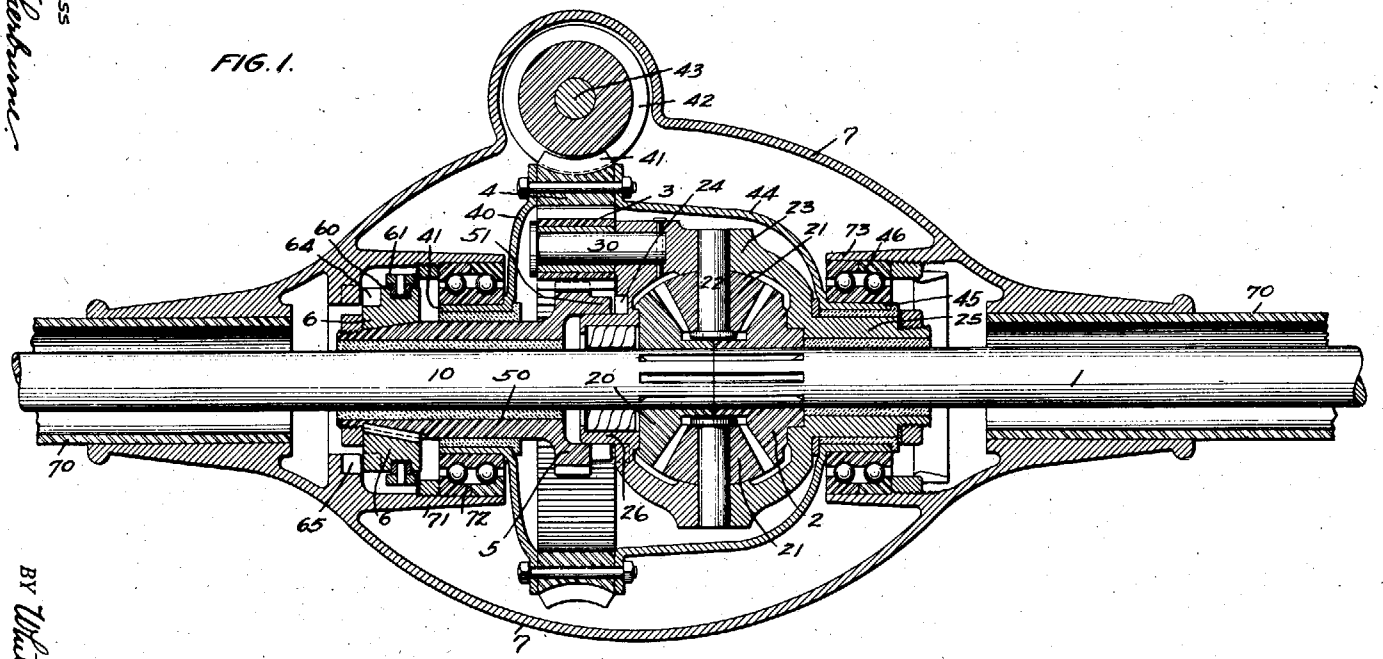
Figure 3:
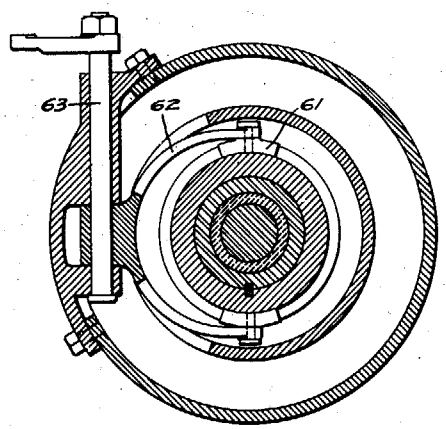
Figure 2:
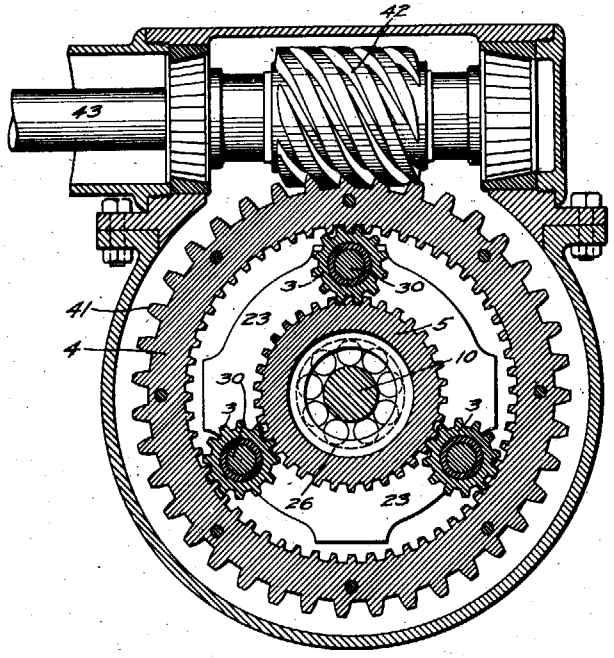

Fig. 1 is a longitudinal section taken upon the plane of the differential shafts or axles. Fig. 2 is a transverse section taken through the gears of the planetary system, the same being substantially on the plane of the transmission shaft. Fig. 3 is a transverse section taken on the plane of the shifting fork.

In the drawings 1 and 10 represent the differential shafts which may be two stub shafts of an automobile rear axle. These shafts have their ends abutting. These are connected by a differential which is, or may be, of a standard construction. The differential shown consists of two beveled gears 2 and 20, intermediate beveled gears 21 which are mounted to turn upon pins 22 carried by frame or casing 23. This part 23 I have called a master ring, although in its physical aspect it most nearly resembles a casing; nevertheless its primary function is to carry its intermediate pinions 21, and through them to impart motion to the differential gears 2 and 20. This ring 23, instead of having a driving gear secured thereto, has a series of journal pins 30, upon which pinions 3 are mounted, these pinions 3 being the intermediate gears of a planetary gear system. As shown in Fig. 2, three of these pinions are used; the numbers of these may be varied in accordance with the necessity or desire.

The outer or master gear 4 of the planetary system is secured to a web 40 which is provided with a sleeve 41 upon which it turns. The inner gear 5 of the planetary system is carried by one end of a sleeve 50, which sleeve is mounted to turn freely upon one of the shafts or axles 10. The master gear 4 of the planetary system is the member through which the power is communicated to drive the axles 1 and 10. The power for turning the combined gear system is primarily applied to the master gear 4. The manner of doing this is in one sense immaterial. As illustrated I have provided the outer surface of the gear 4 with worm teeth 41, and these are engaged by a worm 42 carried by a transmission shaft 43.

The inner end of the sleeve 50 is provided with a set of lugs 51 which are adapted to intermesh with other lugs or recesses carried by the casing 23 of the differential. One of such recesses is shown at 24 in Fig. 1. In the position of the sleeve 50 and the gear 5, as shown in Fig. 1, the above parts are not in engagement, in consequence, they are free to rotate at different speeds. If, however, the gear 5 be moved over toward the differential, so as to enter the lugs 51 in the recesses 24, in the casing 23, this gear will be locked so as to turn with the casing 23, that is with the master ring of the differential.

At the opposite end of the sleeve 50 a shifting collar 6 is provided. This has a groove 60 in its outer periphery, in which are mounted blocks 61 which are pivotally connected with a yoke 62 secured to a shaft 63. By oscillating this shaft, the collar 6, and with it the sleeve 50 and its attached gear 5, may be moved lengthwise so that the recesses 64 which form lugs at one end thereof may be engaged with corresponding recesses or lugs 65 carried by some fixed member, herein shown as carried by the outer casing 7, which incloses the entire mechanism herein described. This casing 7 is herein shown as to be secured to the shaft housings 70 which inclose the differential shafts 1 and 10.

If the sleeve 50 be shifted toward the left hand as the device is shown in Fig. 1, the collar 6 will be engaged with lugs 65 so as to hold this sleeve and attached gear against turning. In this case the intermediate pinions 3 will be caused to travel around the gear 5, carrying with it the master ring or casing 23 of the differential. If the sleeve 50 be shifted in the opposite direction so as to engage the lugs 51 with the lugs 24, carried by the master ring 23 of the differential, the planetary system will be locked so as to revolve as one piece with the master ring of the differential.

The casing 7 has an internally extending sleeve 71 within which is mounted a bearing 72 for the sleeve 50. This sleeve 50 in turn forms a bearing for the shaft 10. A casting 44 is secured to one side of the master gear 4 of the planetary system and incloses the differential. This may form, with the disk 40 and ring 4, a closed casing for the differential, or be an open work spider. At its outer end this casting has a sleeve 45 to which is secured one-half of a bearing 46, the other half of which bearing is carried by a sleeve 73 which extends inwardly from the outer casing 7. The casing or frame 23 which acts as the master ring of the differential, also has a sleeve 25 which has a bearing within the sleeve 45 and also has a bearing for the shaft 1.

The master ring of the differential in the construction illustrated may function as an inclosing casing. It is provided with, or has secured thereto, two rotative bearings, one consisting of the sleeve 25 and the other of the sleeve 26. The latter is indicated as being a roller bearing. The sleeve 50 through the shifting of which the change of speed is secured, has a flange 51 which is journaled upon the outer surface of the sleeve 26.

By the above construction is provided a compact mechanism of such character as to be reliable and to have ample wearing surfaces, through the means of which another change in speed ratio may be employed for driving automobiles. It is not intended ordinarily to substitute this device for the usual speed varying mechanism, but to add the same thereto.

I claim:

1. The combination with a differential gear system of a planetary gear system having its intermediate gears secured to turn with the master ring of the differential, and means for optionally locking the inner gear of the planetary gear system directly to the master ring of the differential or to hold it against turning.

2. The combination with a differential gear system and shafts driven thereby and having a master ring journaled upon the shafts, of a planetary gear system having its intermediate gears carried by said master ring and its inner gear journaled upon the shaft to permit a limited movement lengthwise of the shaft, said inner gear and the master ring of the differential having engageable clutch members, a fixed member having, with the said inner gear engageable clutch members, and means for shifting said inner gear to engage it with said master ring or the fixed member as desired.

3. In a power transmission device, in combination, a differential having a revoluble casing upon which the intermediate gears are mounted, a planetary gear system placed co-axial with the differential and having its intermediate gears mounted upon said revoluble differential casing, the central gear of the planetary system having a sleeve secured thereto, and having a differential shaft journaled therein, an external bearing for said sleeve, each end of the sleeve having one-half of an interlocking clutch, the casing of the differential having complemental clutch members and second complemental clutch members adapted to be engaged by the other end of the sleeve, and a shifting mechanism engaging said sleeve.

4. The combination with a pair of axles, a gear case, and differential gears mounted in said case and connecting the axles, of a planetary gear system having its central gear mounted loosely upon and movable lengthwise of one of the axles, means for locking said central gear to turn with the gear case at one end of its movement on the shaft and for locking it against turning at the other end of its movement lengthwise of the shaft, the intermediate gears of the planetary gear system being mounted to turn with the master wheel of the differential, and means for transmitting power to the outer gear of said planetary gear system.

5. The combination with a differential gear system, of a planetary gear system having its intermediate gears journaled on the differential casing, means for preventing the inner gear of the planetary system from turning, and means interposable between the intermediate gears of the planetary system and the differential casing for preventing the intermediate gears from turning on their respective journal axes to lock the master gear of the planetary system to said differential casing.

6. The combination with a differential gear system, of a planetary gear system having its intermediate gears journaled on the differential casing, means for preventing the inner gear of the planetary system from turning, and a clutch interposed between the intermediate gears of the planetary system and the differential casing for preventing the intermediate gears of the planetary system from turning on their respective journal axes.

7. The combination with a differential gear system, of a planetary gear system having its intermediate gears journaled on the differential casing, means for preventing the inner gear of the planetary system from turning, and engageable clutch members associated with said inner gear and differential casing for locking said inner gear and differential casing against relative rotation.

8. The combination with a differential gear system, of a planetary gear system having its intermediate gears journaled on the differential casing, engagable clutch members associated with the inner gear of the planetary system and the differential casing for locking said inner gear to said differential casing, a fixed element, engageable clutch members associated with said inner gear and said fixed element for locking said inner gear to said fixed element, and means for optionally engaging either set of said clutch members.

9. A device of the character described comprising a housing, axles journaled in said housing, a differential system for driving said axles, a master gear for turning the differential casing, intermediate gears journaled on said differential casing and in mesh with said master gear, an axially movable sleeve journaled concentrically with said axles, engageable clutch members carried by said housing and said sleeve, engageable clutch members carried by said differential casing and said sleeve, a gear fixed for rotation with said sleeve and in mesh with said intermediate gears, and means for axially moving said sleeve to engage either set of said clutch members.

10. A device of the character described comprising a housing, axles journaled in said housing, a differential system for driving said axles , a master gear for turning the differential casing, intermediate gears journaled on said differential casing and in mesh with said master gear, an axially movable sleeve journaled concentrically with said axles, a gear fixed for rotation with said sleeve and in mesh with said intermediate gears, clutch members on said differential casing and on said housing, complementary clutch members on said sleeve, and means for optionally engaging said sleeve clutch members with said differential casing clutch members or said housing clutch members.

11. The combination with a differential gear system, of a planetary gear system having its intermediate gears journaled on the differential casing, and a housing enclosing both gear systems for mounting the master gear of the planetary system.

12. The combination with a differential gear system, of a planetary gear system having its intermediate gears journaled on the differential casing, and a rotatable housing enclosing both gear systems and upon which the master gear of the planetary system is fixed.

13. The combination with a differential gear system, of a planetary gear system having its intermediate gears journaled on the differential casing, a rotatable housing enclosing both gear systems and upon which the master gear of the planetary system is fixed, a fixed element, a sleeve concentric with and extending through one side of said housing and fixed for rotation with the inner gear of the planetary system, and clutch means for optionally locking said sleeve to the differential casing or to said fixed element.

14. The combination with a differential gear system, of a planetary gear system having its intermediate gears journaled on the differential casing, a rotatable housing enclosing both gear systems and upon which the master gear of the planetary system is fixed, and a driving gear for both systems fixed for rotation with said housing.

15. In combination with a pair of axles and a differential system for driving the axles, planetary gears journaled on the differential casing, an inner gear in mesh with said planetary gears, a ring gear in mesh with said planetary gears, a journaled housing member fixed on each side of and supporting said ring gear, and clutch means for holding said inner gear stationary or fixing it for rotation with said differential casing.

16. In combination with a pair of axles and a differential system for driving the axles, planetary gears journaled on the differential casing, an inner gear in mesh with said planetary gears, a ring gear in mesh with said planetary gears, a journaled housing member fixed on each side of and supporting said ring gear, a fixed axle housing in which said housing members are journaled, clutch means for optionally locking said inner gear to said differential casing or to said axle housing, and a driving gear fixed for rotation with said housing members and ring gear.

17. The combination with a differential gear system of a planetary gear system, means for journaling the ring gear of the planetary system, said planetary system having its intermediate gears journaled on the differential casing and its inner gear journaled in the ring gear journaling means and in the differential casing.

In testimony whereof, I have hereunto set my hand at San Francisco, California, this 6th day of April 1922.

CHARLES E. STARR.